US012633317B2

(12) United States Patent
Wang

(10) Patent No.: US 12,633,317 B2
(45) Date of Patent: May 19, 2026

(54) METHOD AND APPARATUS FOR SYNCHRONOUSLY PLAYING VIDEO, AND STORAGE MEDIUM AND ELECTRONIC DEVICE

(71) Applicant: BOE TECHNOLOGY GROUP CO., LTD., Beijing (CN)

(72) Inventor: Kaifan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 98 days.

(21) Appl. No.: 18/712,266

(22) PCT Filed: Sep. 21, 2022

(86) PCT No.: PCT/CN2022/120051

§ 371 (c)(1),
(2) Date: May 22, 2024

(87) PCT Pub. No.: WO2023/116090

PCT Pub. Date: Jun. 29, 2023

(65) Prior Publication Data

US 2025/0014612 A1    Jan. 9, 2025

(30) Foreign Application Priority Data

Dec. 22, 2021    (CN) .......................... 202111582762.3

(51) Int. Cl.
| | |
|---|---|
| *G11B 27/00* | (2006.01) |
| *G11B 27/036* | (2006.01) |
| *G11B 27/10* | (2006.01) |

(52) U.S. Cl.
CPC ............ *G11B 27/10* (2013.01); *G11B 27/036* (2013.01)

(58) Field of Classification Search
CPC ....... G11B 27/00; G11B 27/10; G11B 27/036; H04N 21/00
(Continued)

(56) References Cited

U.S. PATENT DOCUMENTS

| | | | |
|---|---|---|---|
| 11,051,067 B1 | 6/2021 | Baxter et al. | |
| 11,599,254 B2 * | 3/2023 | Zhou ................... | G06F 3/04845 |

(Continued)

FOREIGN PATENT DOCUMENTS

| | | |
|---|---|---|
| CN | 107509100 A | 12/2017 |
| CN | 108184158 A | 6/2018 |

(Continued)

OTHER PUBLICATIONS

International Search Report of PCT application No. PCT/CN2022/120051 dated Dec. 15, 2022.

(Continued)

*Primary Examiner* — Daquan Zhao
(74) *Attorney, Agent, or Firm* — Calfee, Halter & Griswold LLP

(57) ABSTRACT

The present disclosure relates to a method and apparatus for synchronously playing a video, and a storage medium and an electronic device. The method includes: obtaining a first frame picture and a to-be-played video, wherein the first frame picture corresponds to an original video, and the to-be-played video is generated by splicing a beginning of a last frame video corresponding to the original video at an end of the original video; receiving a video playback instruction sent by a master playback device, creating a top picture layer, and rendering the first frame picture to the top picture layer; and when a playback time carried in the video playback instruction is reached, hiding the top picture layer, (Continued)

Obtain a first frame picture and a to-be-played video, wherein the first frame picture corresponds to an original video, and the to-be-played video is generated by splicing a beginning of a last frame video corresponding to the original video at an end of the original video — S810

Send a video playback instruction to a slave playback device, create a top picture layer, and render the first frame picture to the top picture layer, wherein a playback time is carried in the video playback instruction — S820

When the playback time is reached, hide the top picture layer, and synchronously play the to-be-played video based on a time synchronization state with the slave playback device — S830 and synchronously playing the to-be-played video based on a time synchronization state with the master playback device.

19 Claims, 8 Drawing Sheets

(58) Field of Classification Search
USPC .......................... 386/201, 200, 202, 239, 248
See application file for complete search history.

(56) References Cited

U.S. PATENT DOCUMENTS

| | | | |
|---|---|---|---|
| 2016/0342319 A1* | 11/2016 | Wang ................. | H04N 21/8153 |
| 2020/0396498 A1* | 12/2020 | Wang ................... | H04N 21/482 |

FOREIGN PATENT DOCUMENTS

| | | |
|---|---|---|
| CN | 110166788 A | 8/2019 |
| CN | 111918129 A | 11/2020 |
| KR | 20120036848 A | 4/2012 |

OTHER PUBLICATIONS

Written Opinion of PCT application No. PCT/CN2022/120051 dated Dec. 15, 2022.

* cited by examiner

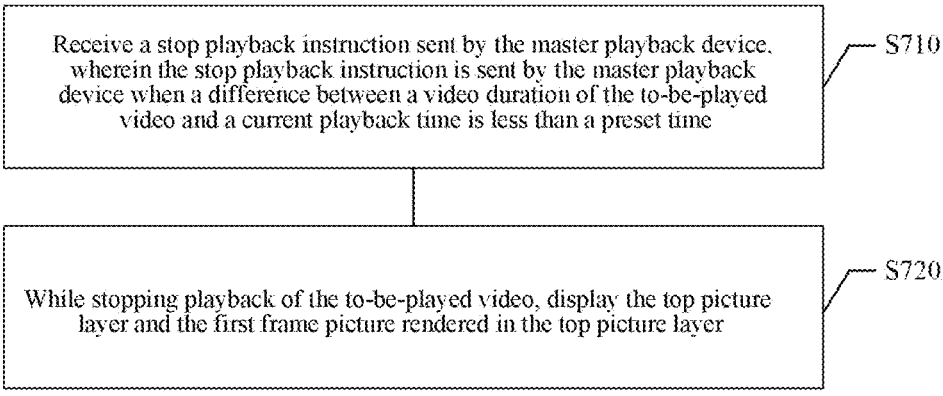

Receive a stop playback instruction sent by the master playback device, wherein the stop playback instruction is sent by the master playback device when a difference between a video duration of the to-be-played video and a current playback time is less than a preset time — S710

While stopping playback of the to-be-played video, display the top picture layer and the first frame picture rendered in the top picture layer — S720

FIG.7

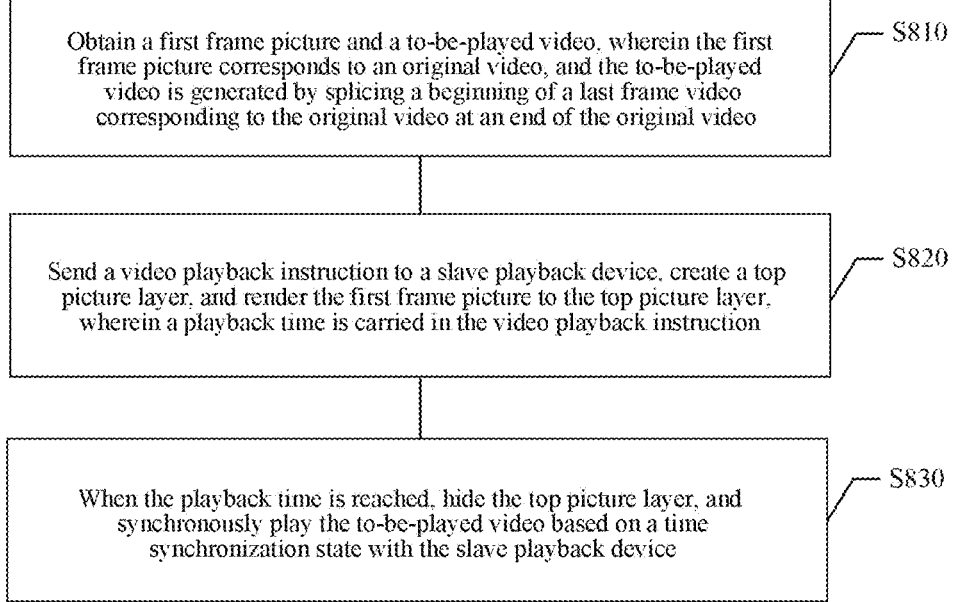

Obtain a first frame picture and a to-be-played video, wherein the first frame picture corresponds to an original video, and the to-be-played video is generated by splicing a beginning of a last frame video corresponding to the original video at an end of the original video — S810

Send a video playback instruction to a slave playback device, create a top picture layer, and render the first frame picture to the top picture layer, wherein a playback time is carried in the video playback instruction — S820

When the playback time is reached, hide the top picture layer, and synchronously play the to-be-played video based on a time synchronization state with the slave playback device — S830

FIG.8

METHOD AND APPARATUS FOR SYNCHRONOUSLY PLAYING VIDEO, AND STORAGE MEDIUM AND ELECTRONIC DEVICE

CROSS-REFERENCE

The present application is a U.S. National Stage of International Application No. PCT/CN2022/120051, filed on Sep. 21, 2022, which is based on and claims the priority to the Chinese Patent Application NO. 202111582762.3, entitled "METHOD AND APPARATUS FOR SYNCHRONOUSLY PLAYING VIDEO, AND STORAGE MEDIUM AND ELECTRONIC DEVICE", filed on Dec. 22, 2021, the entire contents of both of which are hereby incorporated by reference.

TECHNICAL FIELD

The present disclosure relates to the field of video processing technologies, and in particular to a method for synchronously playing a video, a device for synchronously playing a video, a computer-readable storage medium and an electronic device.

BACKGROUND

With the development in a video technology field, the same video may need to be played synchronously on a master playback device and a slave playback device.

It should be noted that the information disclosed in the Background section above is only for enhancing the understanding of the background of the present disclosure, and thus may include information that does not constitute prior art known to those of ordinary skill in the art.

SUMMARY

The present disclosure provides a method for synchronously playing a video, a device for synchronously playing a video, a computer-readable storage medium and an electronic device Additional features and advantages of the present disclosure will be apparent from the following detailed description, or may be learned in part by practice of the present disclosure.

According to a first aspect of embodiments of the present disclosure, there is provided a method for synchronously playing a video. The method includes: obtaining a first frame picture and a to-be-played video, wherein the first frame picture corresponds to an original video, and the to-be-played video is generated by splicing a beginning of a last frame video corresponding to the original video at an end of the original video; receiving a video playback instruction sent by a master playback device, creating a top picture layer, and rendering the first frame picture to the top picture layer; and when a playback time carried in the video playback instruction is reached, hiding the top picture layer, and synchronously playing the to-be-played video based on a time synchronization state with the master playback device.

According to a second aspect of embodiments of the present disclosure, there is provided a method for synchronously playing a video. The method includes: obtaining a first frame picture and a to-be-played video, wherein the first frame picture corresponds to an original video, and the to-be-played video is generated by splicing a beginning of a last frame video corresponding to the original video at an end of the original video; sending a video playback instruction to a slave playback device, creating a top picture layer, and rendering the first frame picture to the top picture layer, wherein a playback time is carried in the video playback instruction; and when the playback time is reached, hiding the top picture layer, and synchronously playing the to-be-played video based on a time synchronization state with the slave playback device.

According to a third aspect of embodiments of the present disclosure, there is provided a system for synchronously playing a video. The system includes a master playback device, a slave playback device and an Internet of Things platform. The Internet of Things platform is configured to send a first frame picture and a to-be-played video to the slave playback device, wherein the first frame picture corresponds to an original video, and the to-be-played video is generated by splicing a beginning of a last frame video corresponding to the original video at an end of the original video. The master playback device is configured to send a video playback instruction to the slave playback device. The slave playback device is configured to obtain the first frame picture and the to-be-played video from the Internet of Things platform, receive the video playback instruction sent from the master playback device, create a top picture layer, render the first frame picture to the top picture layer, and when a playback time carried in the video playback instruction is reached, hide the top picture layer, and synchronously play the to-be-played video based on a time synchronization state with the master playback device.

According to a fourth aspect of the embodiment of the present disclosure, there is provided an electronic device, including a processor and a memory, wherein computer readable instructions are stored on the memory, and the computer readable instructions, when executed by the processor, implement the method for synchronously playing the video in any of the embodiments as described above.

According to a fifth aspect of embodiments of the present disclosure, there is provided a non-transitory computer readable storage medium having a computer program stored thereon which, when executed by a processor, implements the method for synchronously playing the video in any of the embodiments as described above.

It should be noted that the above general description and the following detailed description are merely exemplary and explanatory and should not be construed as limiting of the disclosure.

BRIEF DESCRIPTION OF THE DRAWINGS

The drawings herein are incorporated in and constitute a part of the specification, illustrate embodiments consistent with the present disclosure, and together with the description serve to explain principles of the present disclosure. Apparently, the drawings in the following description are only some embodiments of the present disclosure. For those of ordinary skill in the art, other drawings may be obtained based on these drawings without paying any creative effort.

FIG. 7 schematically shows a flowchart of stopping playback of a to-be-played video in a method for synchronously playing a video;

FIG. 8 schematically shows a flowchart of a method for synchronously playing a video according to an embodiment of the present disclosure;

DETAILED DESCRIPTION

Figure 1:
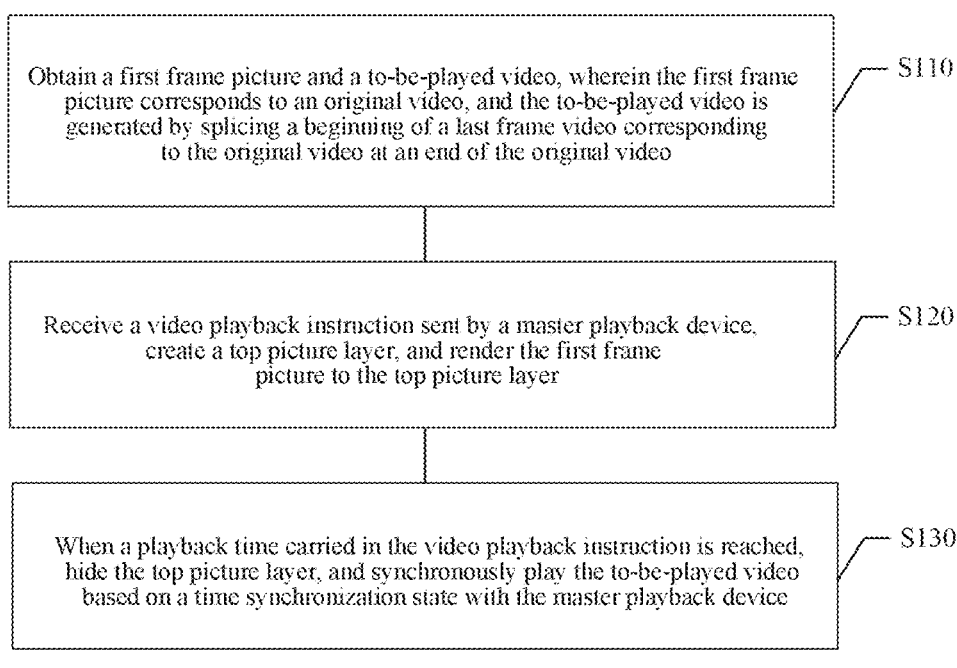
FIG. 1 schematically shows a flowchart of a method for synchronously playing a video according to an embodiment of the present disclosure.

Example embodiments will now be described more fully with reference to the accompanying drawings. However, the embodiments can be implemented in a variety of forms and should not be construed as being limited to examples set forth herein; rather, these embodiments are provided so that the present disclosure will be more comprehensive and complete so as to convey the idea of the example embodiments to those skilled in this art. The described features, structures, or characteristics may be combined in any suitable manner in one or more embodiments. In the following description, many specific details are provided to give a full understanding of the embodiments of the present disclosure. However, those skilled in the art will appreciate that the technical solution of the present disclosure may be practiced without one or more of the specific details, or other methods, components, devices, steps and the like may be employed. In other instances, well-known technical solutions are not shown or described in detail to avoid obscuring various aspects of the present disclosure.

The terms "one", "a", "the", and "said" are used in the present specification to indicate that there are one or more elements/components or the like; the terms "include" and "have" are used to indicate an open meaning of including and means that there may be additional elements/components/etc. in addition to the listed elements/components/etc.; and the terms "first", "second", etc. are used only as markers, and do not limit the number of objects.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities.

In the related arts, due to different loading times of video resources between the master playback device and the slave playback device, when the master playback device notifies the slave playback device to start playing a video synchronously, the video cannot be played synchronously from the same frame of video picture, resulting in the video being not completely synchronized between the master playback device and the slave playback device. The played video has serious jagged feeling, which reduces the experience of users watching the video.

There is an urgent need in this field to develop a new method and device for synchronously playing a video.

The present disclosure provides a method for synchronously playing a video. FIG. 1 shows a schematic flowchart of a method for synchronously playing a video. As shown in FIG. 1, the method for synchronously playing the video at least includes steps S110 to S130.

In the step S110, a first frame picture and a to-be-played video are obtained, the first frame picture corresponds to an original video, and the to-be-played video is generated by splicing a beginning of a last frame video corresponding to the original video at an end of the original video.

In the step S120, a video playback instruction sent by a master playback device is received, a top picture layer is created, and the first frame picture is rendered to the top picture layer.

In the step S130, when a playback time carried in the video playback instruction is reached, the top picture layer is hidden, and the to-be-played video is synchronously played based on a time synchronization state with the master playback device.

In the method and device provided by embodiments of the present disclosure, when the video playback instruction is received, the top picture layer is created and the first frame picture is rendered to the top picture layer, ensuring that the master playback device and the slave playback device can synchronously play the to-be-played video starting from the same frame of video picture in the time synchronization state, avoiding the jagged feeling of the to-be-played video during the playback process, thereby improving the playback effect of the to-be-played video and the user experience of users watching the to-be-played video.

Respective steps of the method for synchronously playing the video are illustrated in details below.

In the step S110, the first frame picture and the to-be-played video are obtained, the first frame picture corresponds to the original video, and the to-be-played video is generated by splicing the beginning of the last frame video corresponding to the original video at the end of the original video.

In embodiments of the present disclosure, the to-be-played video refers to a video that needs to be played in the master playback device and the slave playback device, and the to-be-played video may also be called a target video. In general, the master playback device and the slave playback device obtain the to-be-played video from a video information sending platform, where the master playback device and the slave playback device are both playback devices, which may be a mobile terminal, a fixed terminal, a smart TV, a tablet computer, a smartphone, or any other device with a playback function, and a difference between the two is that the slave playback device needs to perform time correction for its own clock to achieve the time synchronization state with the master playback device. Specifically, the number of master playback devices is typically one, and the number of slave playback devices may be one or more than one. In addition, the master playback device and the slave playback device are typically in a local area network, and which device is the master playback device and which device is the slave playback device in the local area network are determined by modifying configuration information in the device.

The original video refers to a video without being subject to any processing, and the original video may be regarded as being composed of a plurality of frame videos. The first frame picture refers to a picture corresponding to a first frame video in the plurality of frame videos, and likewise, the last frame picture refers to a picture corresponding to the last frame video in the plurality of frame videos. Correspondingly, the last frame video refers to a video obtained by converting the last frame picture, and a video duration of the last frame video is usually a preset duration, which may be specifically 1 second. After the last frame video is obtained, the last frame video is spliced at the end of the original video to form the to-be-played video.

For example, an original video A is obtained, a first frame picture corresponding to a first frame video of the original video A and the last frame picture corresponding to the last frame video of the original video A are determined. The last frame picture is converted to obtain the last frame video with a duration of 1 second, and the last frame video is spliced at the end of the original video to form the to-be-played video.

Figure 2:
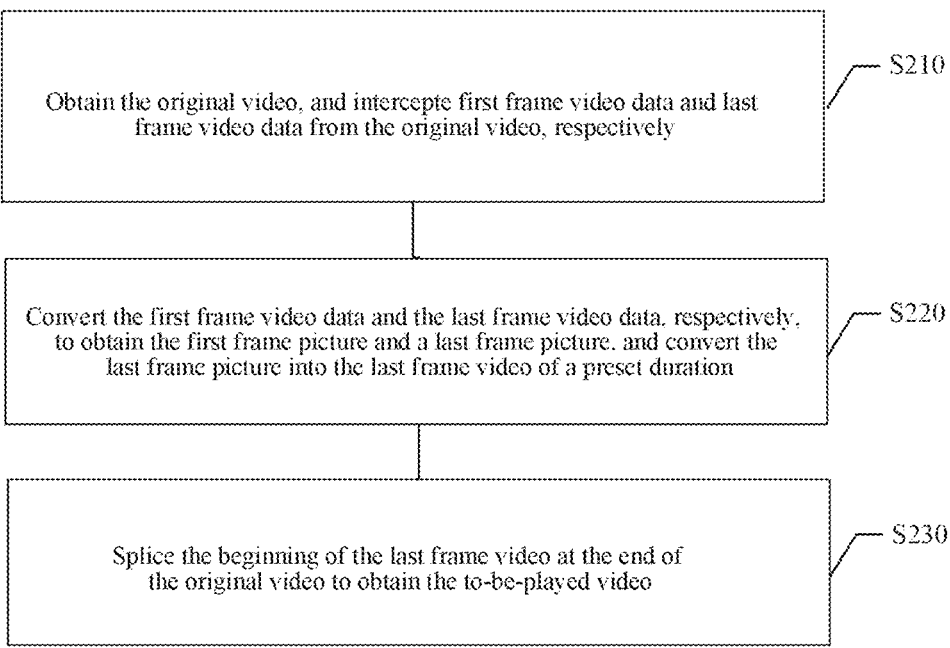
FIG. 2 schematically shows a flowchart of obtaining a first frame picture and a to-be-played video in a method for synchronously playing a video.

In an embodiment of the present disclosure, FIG. 2 shows a schematic flowchart of obtaining the first frame picture and the to-be-played video in the method for synchronously playing the video. As shown in FIG. 2, the method at least includes steps S210 to S230.

In the step S210, the original video is obtained, and first frame video data and last frame video data are intercepted from the original video.

The first frame video data refers to first frame video data of the original video, and the last frame video data refers to the last frame video data of the original video.

For example, the original video A is obtained, and first frame video data and last frame video data of the original video A are intercepted to obtain the first frame video data and the last frame video data.

In the step S220, the first frame video data and the last frame video data are converted, respectively, to obtain the first frame picture and the last frame picture, and the last frame picture is converted into the last frame video of a preset duration.

The first frame video data may be converted into a picture format, that is, the first frame picture is obtained. Similarly, the last frame video data may also be converted into the picture format to obtain the last frame picture, so as to obtain the last frame video of the preset duration through the last frame picture.

Specifically, the preset duration is generally 1 second, and the last frame picture corresponds to the last $\frac{1}{12}$ second of video data of the original video. Therefore, in order to convert the last frame picture into the last frame video with the preset duration of 1 second, it is necessary to repeatedly generate eleven last frame pictures on the basis of the last frame picture, and use twelve last frame pictures to obtain the last frame video of the preset duration.

For example, the first frame video data and the last frame video data are intercepted from the original video A, the first frame video data is converted into the first frame picture XX in the picture format, and the last frame video data is converted into the last frame picture B in the picture format. Eleven last frame pictures B are repeatedly generated on the basis of the last frame picture B, and the twelve last frame pictures B are converted into the last frame video C with the preset duration of 1 second.

In the step S230, the beginning of the last frame video is spliced at the end of the original video to obtain the to-be-played video.

The last frame video is spliced at the end of the original video to obtain the to-be-played video.

For example, the last frame video C is spliced at the end of the original video A. That is, assuming that a duration of the original video is 1 hour, and in this case, the last frame video with the preset duration of 1 second is spliced at the end of the original video, and the resulting to-be-played video has a duration of 1 hour and 1 second.

In embodiments of the present disclosure, on the one hand, converting the first frame video data into the first frame picture helps to subsequently render the first frame picture on the created top picture layer when the video playback instruction sent by the master playback device is received, so that the master playback device and the slave playback device can synchronously render the first frame of the to-be-played video when the playback time is reached; on the other hand, converting the last frame picture into the last frame video of the preset length helps to obtain the spliced to-be-played video, ensuring that the displayed picture of the to-be-played video is consistent when the playback of the to-be-played video is stopped subsequently.

In the step S120, the video playback instruction sent by the master playback device is received, the top picture layer is created, and the first frame picture is rendered to the top picture layer.

In embodiments of the present disclosure, the video playback instruction is an instruction to play the to-be-played video, and the top picture layer refers to a picture layer with the highest display priority, which will cover the display content of other picture layers.

Figure 3:
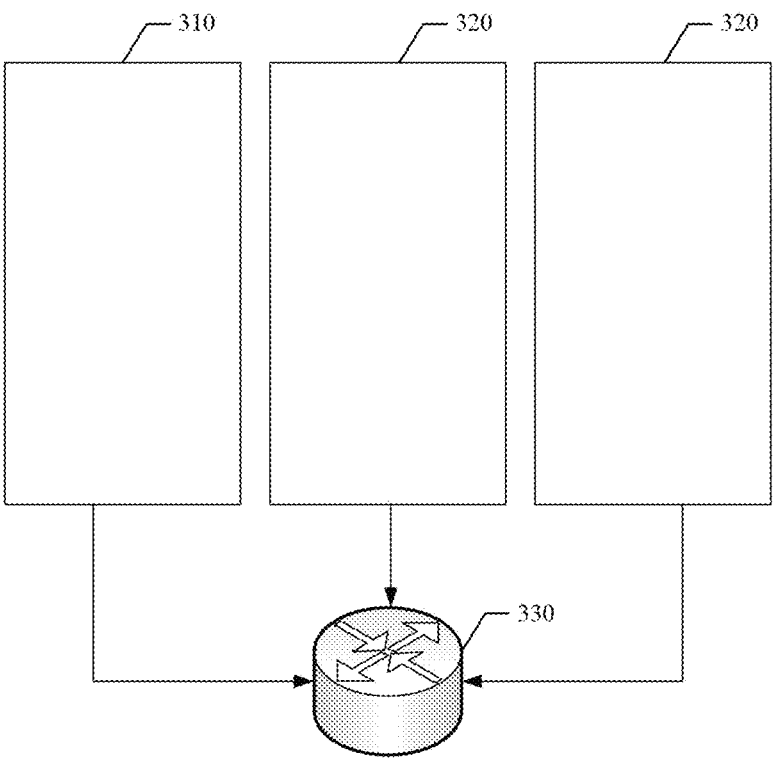
FIG. 3 schematically shows a diagram of a splicing screen in a method for synchronously playing a video.

For example, FIG. 3 schematically shows a diagram of a splicing screen. As shown in FIG. 3, a device 310 may be a master playback device, a plurality of devices 320 may be slave playback devices, and the master playback device 310 and the slave playback devices 320 are in the same local area network through connection with a router 330.

When the plurality of slave playback devices 320 receive the video playback instruction sent by the master playback device 310, the plurality of slave playback devices create top picture layers and display first frame pictures in the top picture layers. In this case, the same video picture is displayed on the plurality of slave playback devices.

Figure 4:
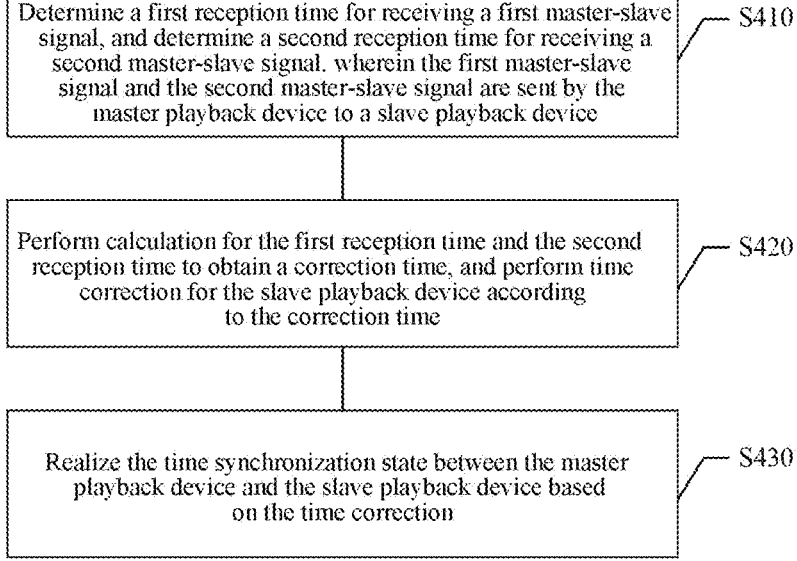
FIG. 4 schematically shows a flowchart of realizing a time synchronization state between a master playback device and a slave playback device in a method for synchronously playing a video.

In an embodiment of the present disclosure, FIG. 4 shows a schematic flowchart of realizing a time synchronization state between a master playback device and a slave playback device in the method for synchronously playing the video. As shown in FIG. 4, the method at least includes steps S410 to S430.

In the step S410, a first reception time when a first master-slave signal is received is determined, and a second reception time when a second master-slave signal is received is determined, the first master-slave signal and the second master-slave signal are both sent from the master playback device to the slave playback device.

The first master-slave signal refers to a signal sent by the master playback device to the slave playback device, and the second master-slave signal refers to a signal sent by the master playback device to the slave playback device that is different from the first master-slave signal. Correspondingly, the first reception time refers to the time when the first master-slave signal is received by the slave playback device, and the second reception time refers to the time when the second master-slave signal is received by the slave playback device.

Figure 5:
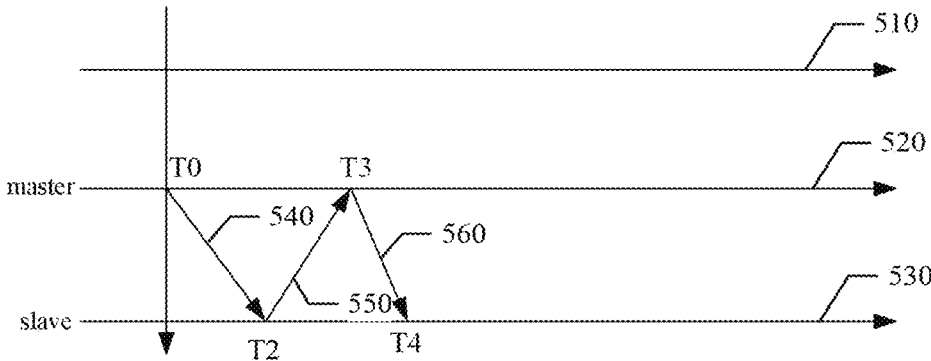
FIG. 5 schematically shows a diagram of signal transmission between a master playback device and a slave playback device in a method for synchronously playing a video.

For example, FIG. 5 shows a schematic diagram of signal transmission between a master playback device and a slave playback device. As shown in FIG. 5, an abscissa 510 is an absolute time, an abscissa 520 is an absolute time of the master playback device, and an abscissa 530 is an absolute time of the slave playback device. The absolute time of the master playback device refers to a system time of the master playback device, and correspondingly, the absolute time of the slave playback device refers to a system time of the slave playback device.

An arrow 540 represents the first master-slave signal sent from the master playback device to the slave playback device, an arrow 550 represents a slave-master signal sent from the slave playback device to the master playback device, and an arrow 560 represents the second master-slave signal sent from the master playback device to the slave playback device. A time T0 is a time when the master playback device sends the first master-slave signal, a time T2 is a time when the slave playback device receives the first master-slave signal, and accordingly, the time T2 is the first reception time. A time T3 is a time when the master playback device receives the slave-master signal, a time T4 is a time when the slave playback device receives the second master-slave signal, and accordingly, the time T4 is the second reception time.

It should be noted that the first master-slave signal and the second master-slave signal are sent by the master playback device to the slave playback device using a user datagram protocol. In addition, the slave-master signal shown by the arrow 550 in FIG. 5 is sent by the slave playback device to the master playback device using the user datagram protocol. Based on this, since the user datagram protocol has better real-time performance and efficient transmission, it enables the master playback device to transmit the first master-slave signal and the second master-slave signal with a higher transmission speed, and enables the slave-master signal to send the slave-master signal to the master playback device at a higher speed, thereby achieving the time synchronization state between the master playback device and the slave playback device at a faster speed.

In the step S420, calculation is performed for the first reception time and the second reception time to obtain a correction time, and time correction is performed for the slave playback device according to the correction time.

Since there may be a difference between the absolute time of the master playback device and the absolute time of the slave playback device, there is no time synchronization state between the master playback device and the slave playback device.

By means of the transmission of the first master-slave signal, the slave-master signal and the second master-slave signal as shown in FIG. 5, the first reception time and the second reception time can be determined, and then a time required for the signal to be transmitted from the slave playback device to the master playback device, and then from the master playback device back to the slave playback device is determined. By calculating this time, a time deviation of the slave playback device relative to the master playback device can be obtained, that is, the correction time can be calculated.

Based on this, by performing the time correction for the slave playback device through the correction time, the time synchronization state between the master playback device and the slave playback device can be achieved.

For example, as shown in FIG. 5, the master playback device sends the first master-slave signal to the slave playback device at time T0, and the slave playback device receives the first master-slave signal at time T2. Therefore, it is determined that T2 is the first reception time. After receiving the first master-slave signal, the slave playback device sends the slave-master signal to the master playback device, and the master playback device receives the slave-master signal at time T3. After receiving the slave-master signal, the master playback device sends the second master-slave signal to the slave playback device, and the slave playback device receives the second master-slave signal at time T4. Therefore, T4 is the second reception time.

Based on this, a signaling delay Tdelay (i.e., the correction time) between the master playback device and the slave playback device can be obtained according to Formula 1, and the time correction is performed for the slave playback device according to the correction time to realize the synchronization state between the master playback device and the slave playback device.

$$T_{delay} = \frac{(T4 - T2)}{2} \qquad (1)$$

where Tdelay is the correction time, T4 is a time when the second master-slave signal is received by the slave playback device, and T2 is a time when the first master-slave signal is received by the slave playback device.

In the step S430, the time synchronization state between the master playback device and the slave playback device is achieved based on the time correction.

After the time correction is performed for the slave playback device, the time synchronization state between the master playback device and the slave playback device can be achieved.

For example, on the basis of the correction time, that is, on the basis of the time synchronization between the master playback device and the slave playback device, the time synchronization state between the master playback device and the slave playback device can be achieved.

In embodiments of the present disclosure, before the video playback instruction sent by the master playback device is received, it is necessary to achieve the time synchronization state between the master playback device and the slave playback device to ensure that subsequent playback of the to-be-played video can be started or stopped at the same moment.

Figure 6:
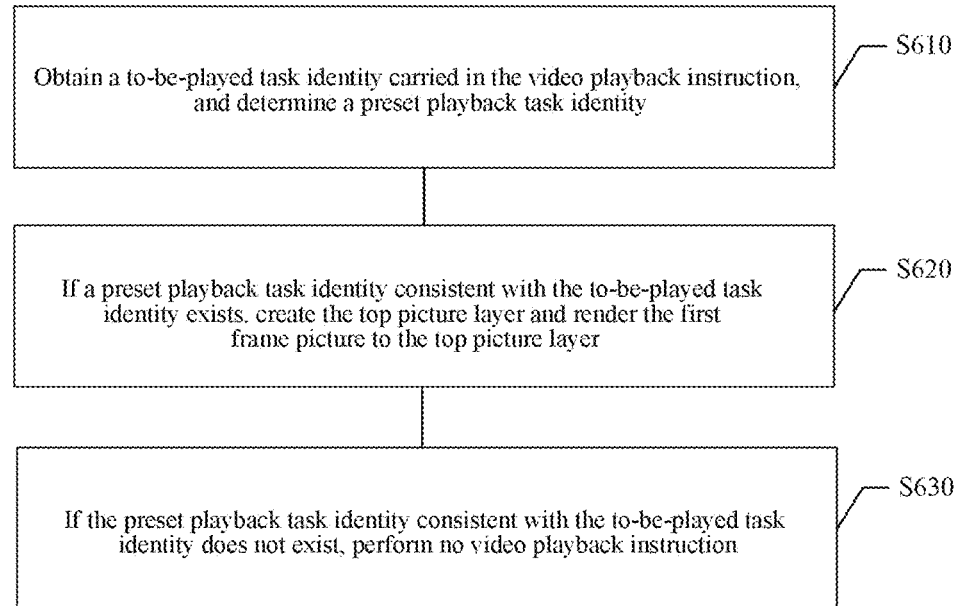
FIG. 6 schematically shows a flowchart of rendering a first frame picture to a top picture layer in a method for synchronously playing a video.

In an embodiment of the present disclosure, FIG. 6 shows a schematic flowchart of rendering the first frame picture to the top picture layer in the method for synchronously playing the video. As shown in FIG. 6, the method at least includes steps S610 to S630.

In the step S610, a to-be-played task identity carried in the video playback instruction is obtained, and a preset playback task identity is determined.

The to-be-played task identity is carried in the video playback instruction. Specifically, the to-be-played task identity may be in the form of numbers or letters, which is not specifically limited by embodiments of the present disclosure. In addition, the to-be-played task identity may represent a playback task corresponding to the video playback instruction.

It should be noted that the video playback instruction is sent by the master playback device to the slave playback device using the user datagram protocol. Due to the real-time performance and high transmission efficiency of the user datagram protocol itself, it is ensured that the slave playback device can receive the video playback instruction sent by the master playback device in a short time, thereby ensuring the efficiency of subsequent synchronous playback of the to-be-played video.

The preset playback task identity represents an identity of a video task that can be played on the slave playback device. Specifically, the preset playback task identity may be a number or a letter, which is not specifically limited by embodiments of the present disclosure.

For example, the video playback instruction is received by a slave playback device 1, and the video playback instruction carries a to-be-played task identity D. In this case, it is also necessary to determine the identity of the video task that can be played on the slave playback device, that is, the preset playback task identity is obtained, and the preset playback task identity is E.

In the step S620, if there is a preset playback task identity consistent with the to-be-played task identity, the top picture layer is created, and the first frame picture is rendered to the top picture layer.

If the to-be-played task identity is consistent with the preset playback task identity, it indicates that the slave playback device is allowed to play the to-be-played video in this case, then the top picture layer is created, and the first frame picture is rendered to the top picture layer.

For example, the to-be-played task identity is D, and there are three preset playback task identities. Specifically, the three preset playback task identities are D, E, and F, and in this case, there is a preset task identity that is consistent with the to-be-played task identity D, the top picture layer is created, and the first frame picture is rendered to the top picture layer.

In the step S630, if there is no preset playback task identity consistent with the to-be-played task identity, the video playback instruction is not performed.

If the to-be-played task identity is inconsistent with the preset playback task identity, it indicates that the slave playback device is not allowed to play the to-be-played video in this case, and then the video playback instruction sent by the master playback device is not performed, and the to-be-played video corresponding to the video playback instruction is not played.

For example, the to-be-played task identity is G, and there are three preset playback task identities. Specifically, the three preset playback task identities are D, E, and F, and in this case, there is no preset playback task identity consistent with the to-be-played task identity G, and the slave playback device will not perform the received video playback instruction.

In embodiments of the present disclosure, the logic of creating the top picture layer to render the first frame picture on the top picture layer is improved. When there is no preset playback task identity consistent with the to-be-played task identity, the video playback instruction will not be performed, avoiding playing the wrong to-be-played video in the slave playback device and reducing the unnecessary performance loss.

In the step S130, when the playback time carried in the video playback instruction is reached, the top picture layer is hidden, and the to-be-played video is synchronously played based on the time synchronization state with the master playback device.

In embodiments of the present disclosure, the video playback instruction also carries the playback time, which refers to a time for playing the to-be-played video. When this time is reached, the top picture layer needs to be hidden and the to-be-played video is synchronously played based on the time synchronization state between the master playback device and the slave playback device.

For example, the playback time carried in the video playback instruction is XX. When the time reaches XX, the slave playback device will hide the top picture layer and start playing the to-be-played video. It should be noted that since the slave playback device is synchronized with the master playback device in terms of time, the master playback device and the slave playback device can play the to-be-played video synchronously at time XX. Not only that, only when the playback time is reached, the top picture layer is hidden to ensure that the master playback device and the slave playback device start playing the to-be-played video from the same frame of video picture.

In an embodiment of the present disclosure, FIG. 7 shows a schematic flowchart of stopping playing the to-be-played video in the method for synchronously playing the video. As shown in FIG. 7, the method at least includes steps S710 and S720.

In the step S710, a stop playback instruction sent by the master playback device is received, and the stop playback instruction is sent by the master playback device when a difference between a video duration of the to-be-played video and the current playback time is less than a preset duration.

The stop playback instruction refers to an instruction to stop playing the to-be-played video, and the stop playback instruction is sent by the master playback device. It should be noted that the master playback device detects a playback progress of the to-be-played video in real time to send the stop playback instruction when the difference between the video duration of the to-be-played video and the current playback time is less than the preset duration. The video duration refers to a total playback duration of the to-be-played video, and the current playback time refers to a time that the to-be-played video is being played on the master playback device at this moment.

For example, the master playback device monitors the playback progress of the to-be-played video in real time, and monitors that the current playback time of the to-be-played video at this moment is 1 hour and 0.1 second, and the video duration of the to-be-played video is hour and 1 second. At this time, the difference between the duration of the to-be-played video and the current playback time is less than the preset duration of 1 second, and the master playback device sends the stop playback instruction to the slave playback device.

In the step S720, while stopping playing the to-be-played video, the top picture layer and the first frame picture rendered in the top picture layer are displayed.

When the stop playback instruction is received by the slave playback device, the hidden top picture layer is redisplayed and the first frame picture rendered in this picture layer is displayed.

For example, when the stop playback instruction is received by the slave playback device, the hidden top picture layer is redisplayed, and the first frame picture B rendered in this picture layer is redisplayed.

In embodiments of the present disclosure, since the to-be-played video is generated by splicing the beginning of the last frame video at the end of the original playback video, when the stop playback instruction is received, all the content of the original playback video has been played, and at this time, the playback of the to-be-played video is stopped, and the top picture layer and the first frame picture rendered in the top picture layer are displayed, which not only can ensure that the slave playback device and the master playback device stop playing the to-be-played video at the same moment, but also can ensure that the same frame of video picture is displayed on the master playback device and the slave playback device when the playback is stopped. The synchronous playback of the to-be-played video is ensured at all times, avoiding the jagged feeling that occurs during the playback of the to-be-played video in the prior art, and improving the audience's experience.

In the method and device provided by embodiments of the present disclosure, when the video playback instruction is received, the top picture layer is created and the first frame picture is rendered to the top picture layer, ensuring that the master playback device and the slave playback device can synchronously play the to-be-played video starting from the same frame of video picture in the time synchronization state, avoiding the jagged feeling of the to-be-played video during the playback process, thereby improving the playback effect of the to-be-played video and the user experience of users watching the to-be-played video.

The present disclosure further provides a method for synchronously playing a video. FIG. 8 shows a schematic flowchart of a method for synchronously playing a video. As shown in FIG. 8, the method for synchronously playing the video at least includes steps S810 to S830.

In the step S810, a first frame picture and a to-be-played video are obtained, the first frame picture corresponds to an original video, and the to-be-played video is generated by splicing a beginning of a last frame video corresponding to the original video at an end of the original video.

In the step S820, a video playback instruction is sent to a slave playback device, a top picture layer is created, and the first frame picture is rendered to the top picture layer, the video playback instruction carries a playback time.

In the step S830, when the playback time is reached, the top picture layer is hidden, and the to-be-played video is synchronously played based on a time synchronization state with the slave playback device.

In the method and device provided by embodiments of the present disclosure, when the video playback instruction is sent, the top picture layer is created and the first frame picture is rendered to the top picture layer, ensuring that the master playback device and the slave playback device can play the to-be-played video starting from the same frame of video picture in the time synchronization state, avoiding the jagged feeling of the to-be-played video during the playback process, thereby improving the playback effect of the to-be-played video and the user experience of users watching the to-be-played video.

Respective steps of the method for synchronously playing the video are illustrated in details below.

In the step S810, the first frame picture and the to-be-played video are obtained, the first frame picture corresponds to the original video, and the to-be-played video is generated by splicing the beginning of the last frame video corresponding to the original video at the end of the original video.

In embodiments of the present disclosure, the to-be-played video obtained by the master playback device is the same as the to-be-played video obtained by the slave playback device, and the first frame picture, the original video and the last frame video obtained by the master playback device are consistent with the first frame picture, the original video and the last frame video obtained by the slave playback device.

For example, the master playback device obtains the original video A, determines the first frame picture corresponding to the first frame video of the original video A and the last frame picture corresponding to the last frame video of the original video A, and converts the last frame picture into the last frame video with a duration of 1 second to splice the last frame video at the end of the original video to form the to-be-played video.

In embodiments of the present disclosure, on the one hand, the first frame picture is obtained, which can ensure that the master playback device and the slave playback device subsequently start playing the to-be-played video from the same video picture; on the other hand, the to-be-played video is generated by splicing the beginning of the last frame video at the end of the original video, which ensures that when the stop playback instruction is sent later, all the video content of the original video has been played, avoiding the occurrence of the phenomenon that the to-be-played video is not played completely.

In the step S820, the video playback instruction is sent to the slave playback device, the top picture layer is created, and the first frame picture is rendered to the top picture layer, the video playback instruction carries the playback time.

In embodiments of the present disclosure, after the master playback device sends the video playback instruction to the slave playback device, the master playback device also needs to create the top picture layer and render the first frame picture to the top picture layer. The video playback instruction also carries a time to play the to-be-played video, that is, it carries the playback time.

For example, the master playback device sends to the slave playback device the video playback instruction carrying the playback time. After sending the video playback instruction, the master playback device also needs to create the top picture layer and render the first frame picture B to the top picture layer.

In the step S830, when the playback time is reached, the top picture layer is hidden, and the to-be-played video is synchronously played based on the time synchronization state with the slave playback device.

In embodiments of the present disclosure, the master playback device also needs to hide the top picture layer when the playback time is reached. After the top picture layer is hidden, the to-be-played video is played based on the time synchronization state between the master playback device and the slave playback device.

For example, when the playback time XX1 is reached, the master playback device hides the top picture layer and plays the to-be-played video based on the time synchronization state with the slave playback device.

For example, in a video synchronization system, the master playback device may be a split screen 1 in a splicing screen A, and the slave playback devices may be other split screens in the splicing screen A, such as a split screen 2 and a split screen 3. The split screen 1, the split screen 2 and the split screen 3 are in the same local area network.

The split screen 2 and the split screen 3 obtain the first frame picture and the to-be-played video from an Internet of Things platform, and after receiving the video playback instruction sent by the split screen 1, the split screen 2 and the split screen 3 create top picture layers and render the first frame picture to the top picture layers. When the playback time is reached, the split screen 2 and the split screen 3 hide the top picture layers and synchronously play the to-be-played video based on the time synchronization state with the split screen 1.

In addition, after sending the video playback instruction, the split screen 1 as the master playback device also needs to create the top picture layer and render the first frame picture to the top picture layer. When the playback time is reached, the split screen 1 hides the top picture layer and synchronously plays the to-be-played video based on the time synchronization state with the split screen 2 and the split screen 3.

Based on this, playback pictures of the split screen 1, the split screen 2 and the split screen 3 are consistent when they start playing the to-be-played video, and playback pictures of the split screen 1, the split screen 2 and the split screen 3 are also consistent when they stop playing the to-be-played video, which greatly reduces the jagged feeling on the split screen 1, the split screen 2 and the split screen 3, and improves the audience's watching experience.

In embodiments of the present disclosure, after sending the video playback instruction to the slave playback device, the master playback device also needs to create the top picture layer to ensure that the master playback device and the slave playback device subsequently start playing the to-be-played video from the same video picture.

Figure 9:
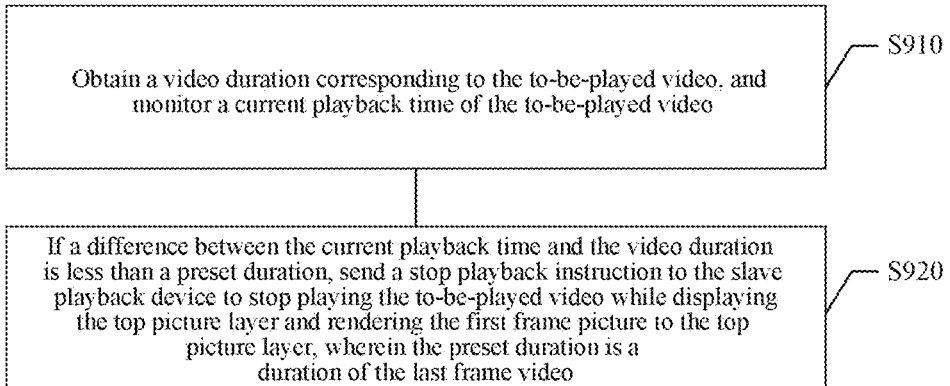
FIG. 9 schematically shows a flowchart of stopping playback of a to-be-played video in a method for synchronously playing a video.

In an embodiment of the present disclosure, FIG. 9 shows a schematic flowchart of stopping playback of the to-be-played video in the method for synchronously playing the video. As shown in FIG. 9, the method at least includes steps S910 and S920.

In the step S910, a video duration corresponding to the to-be-played video is obtained, and a current playback time of the to-be-played video is monitored.

In embodiments of the present disclosure, the video duration is a total playback duration of the to-be-played video, and the current playback time is a current playback time of the to-be-played video monitored by the master playback device.

For example, the video duration corresponding to the to-be-played video is obtained to be 1 hour and 1 second, and the current playback time of the to-be-played video is monitored to be 1 hour and $\frac{1}{60}$ seconds.

In the step S920, if a difference between the current playback time and the video duration is less than a preset duration, a stop playback instruction is sent to the slave playback device to make the slave playback device stop playing the to-be-played video while displaying the top picture layer and the first frame picture rendered in the top picture layer, and the preset duration is a duration of the last frame video.

When the difference between the current playback time and the video duration is less than the preset duration, the master playback device sends the stop playback instruction to the slave playback device. After sending the stop playback instruction, the master playback device stops playing the to-be-played video, redisplays the hidden top picture layer and re-renders the first frame picture to the top picture layer.

For example, the duration of the last frame video is 1 second, the current playback time is 1 hour and $\frac{1}{60}$ seconds, and the video duration of the to-be-played video is 1 hour and 1 second. In this case, the difference between the current playback time and the video duration is less than 1 second, and the master playback device needs to send the stop playback instruction to the slave playback device. After sending the stop playback instruction, the master playback device stops playing the to-be-played video, displays the hidden top picture layer, and re-renders the first frame picture on the top picture layer.

In embodiments of the present disclosure, since the to-be-played video is generated by splicing the beginning of the last frame video at the end of the original video, when the stop playback instruction is sent, all the playback content of the original playback video has been played, and at this time, the playback of the to-be-played video is stopped, the top picture layer is displayed and the first frame picture is rendered in the top picture layer, which not only can ensure that the slave playback device and the master playback device stop playing the to-be-played video at the same moment, but also can ensure that the same frame of video picture is displayed on the master playback device and the slave playback device when the playback is stopped. The synchronous playback of the to-be-played video is ensured at all times, avoiding the jagged feeling that occurs during the playback of the to-be-played video in the prior art, and improving the audience's experience.

In the method and device provided by embodiments of the present disclosure, when the video playback instruction is sent, the top picture layer is created and the first frame picture is rendered to the top picture layer, ensuring that the master playback device and the slave playback device can synchronously play the to-be-played video starting from the same video picture in the time synchronization state, avoiding the jagged feeling of the to-be-played video during the playback process, thereby improving the playback effect of the to-be-played video and the user experience of users watching the to-be-played video.

The method for synchronously playing the video in embodiments of the present disclosure will be described in details below in conjunction with an application scenario.

It is assumed that it is determined that the device 310 shown in FIG. 3 is the master playback device, and the plurality of devices 320 shown in FIG. 3 are the slave playback devices by modifying the configuration information in this case.

Figure 10:
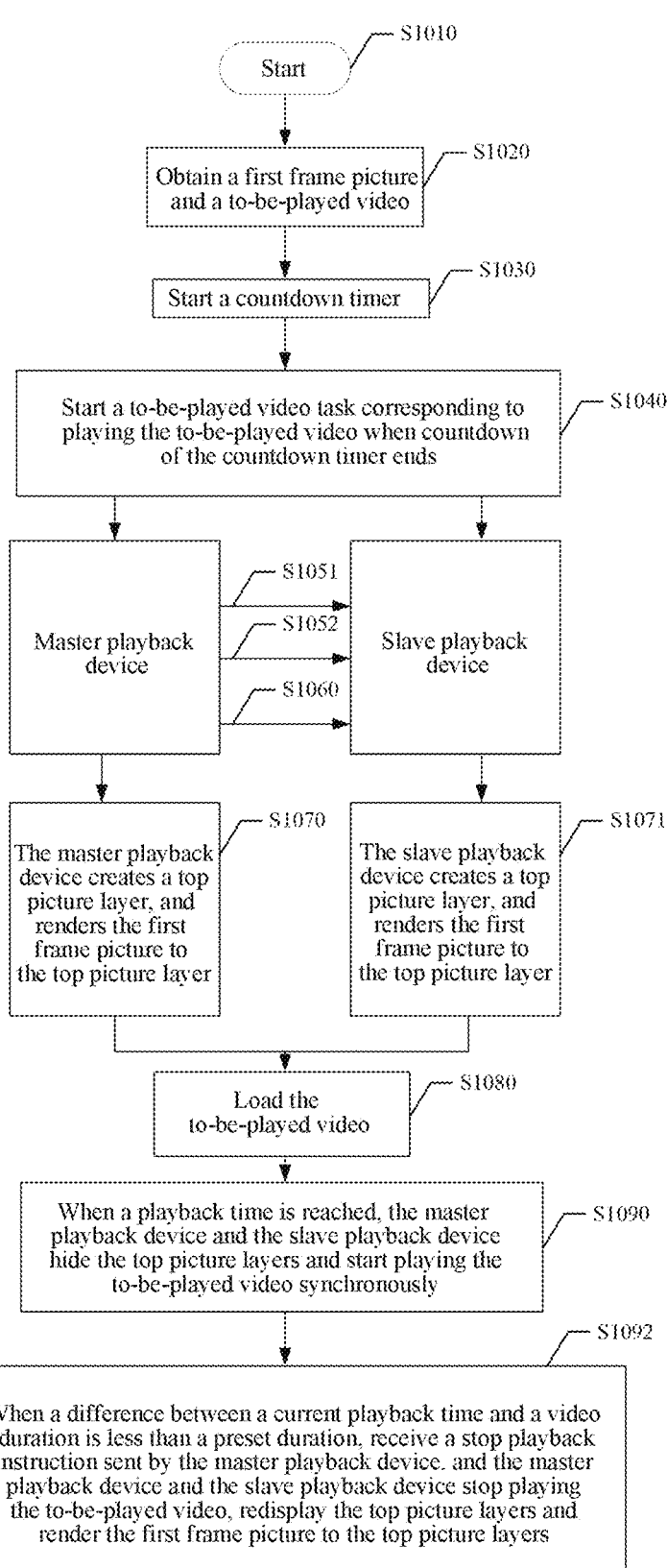
FIG. 10 schematically shows a flowchart of a method for synchronously playing a video in an application scenario shown in FIG. 3.

FIG. 10 schematically shows a flowchart of a method for synchronously playing a video in an application scenario shown in FIG. 3. As shown in FIG. 10, step S1010 is a starting step, step S1020 is a process of obtaining a first frame picture and a to-be-played video, step S1030 is to start a countdown timer, that is, set a countdown timer to start a task of playing the to-be-played video, and step S1040 is to start a to-be-played video task corresponding to playing the to-be-played video when the countdown of the countdown timer ends.

In this case, it is first necessary to perform step S1051, that is, the master playback device sends the first master-slave signal and the second master-slave signal to the slave playback device, and then step S1052 is performed, where the slave playback device determines the first reception time corresponding to the first master-slave signal and the second reception time corresponding to the second master-slave signal, and performs calculation based on the first reception time and the second reception time to obtain the correction time, so as to correct the time of the slave playback device, thereby realizing the time synchronization state between the master playback device and the slave playback device.

Then step S1060 is performed, where the to-be-played task identity is obtained, and it is determined whether the to-be-played task identity is consistent with the preset playback task identity; and if the to-be-played task identity is consistent with the preset playback task identity, the video playback instruction is received.

In this case, steps S1070 and S1771 are performed. In the step S1770, the master playback device creates the top picture layer and renders the first frame picture to the top picture layer. In the step S1771, the slave playback device creates the top picture layer, and renders the first frame picture to the top picture layer.

Then step S1080 is performed, where the to-be-played video is loaded, and then step S1090 is performed, where when the playback time is reached, the master playback device and the slave playback device hide the top picture layers and start playing the to-be-played video synchronously.

In addition, step S1092 also needs to be performed, where when the difference between the current playback time and the video duration is less than the preset duration, the stop playback instruction sent by the master playback device is received, and the master playback device and the slave playback device stop playing the to-be-played video, redisplay the top picture layers and render the first frame picture to the top picture layers.

In this application scenario, when the video playback instruction is received, the top picture layer is created and the first frame picture is rendered to the top picture layer, ensuring that the master playback device and the slave playback device can synchronously play the to-be-played video starting from the same frame of video picture in the time synchronization state, avoiding the jagged feeling of the to-be-played video during the playback process, thereby improving the playback effect of the to-be-played video and the user experience of users watching the to-be-played video.

In addition, embodiments of the present disclosure further provide a system for synchronously playing a video, which includes a master playback device, a slave playback device, and an Internet of Things platform.

The Internet of Things platform is configured to send a first frame picture and a to-be-played video to the slave playback device, the first frame picture corresponds to an original video, and the to-be-played video is generated by splicing a beginning of a last frame video corresponding to the original video at an end of the original video.

The master playback device is configured to send a video playback instruction to the slave playback device.

The slave playback device is configured to: obtain the first frame picture and the to-be-played video from the Internet of Things platform, receive the video playback instruction sent by the master playback device, create a top picture layer, render the first frame picture to the top picture layer, and when a playback time carried in the video playback instruction is reached, hide the top picture layer, and synchronously play the to-be-played video based on a time synchronization state with the master playback device.

The Internet of Things platform in this system refers to a platform that sends the first frame picture and the to-be-played video to the master playback device. In addition, the master playback device, the slave playback device, the first frame picture, the to-be-played video, the video playback instruction and the top picture layer are consistent with those in the method for synchronously playing the video.

In an embodiment of the present disclosure, before the sending the first frame picture and the to-be-played video to the master playback device and the slave playback device, the Internet of Things platform is configured to send a synchronous playback task to the master playback device, and the synchronous playback task corresponds to the to-be-played video.

Specifically, the synchronous playback task corresponds to the to-be-played video, that is, when the master playback device receives the synchronous playback task, it will learn that there are one or more to-be-played videos at this time, which need to be played synchronously on the master playback device and the slave playback device.

In an embodiment of the present disclosure, before the sending the video playback instruction to the slave playback device, the master playback device is configured to start a countdown timer corresponding to the synchronous playback task to send the video playback instruction to the slave playback device when countdown corresponding to the countdown timer ends.

The countdown timer corresponds to the synchronous playback task. Specifically, a countdown is set in the countdown timer, and assuming that the countdown set in the countdown timer is 10 seconds, then after 10 seconds, that is, when the countdown ends, the video playback instruction is sent to the slave playback device.

In an embodiment of the present disclosure, when obtaining the first frame picture and the to-be-played video from the Internet of Things platform, the slave playback device is further configured to: obtain the original video, and intercept first frame video data and last frame video data from the original video, respectively; convert the first frame video data and the last frame video data, respectively, to obtain the first frame picture and a last frame picture, and convert the last frame picture into the last frame video of a preset duration; and splice the beginning of the last frame video at the end of the original video to obtain the to-be-played video.

In the process of obtaining the first frame picture and the to-be-played video from the Internet of Things platform, the slave playback device first needs to obtain the original video, and intercept the first frame video data and the last frame data from the original video, respectively. This process is consistent with the step S210 in the method for synchronously playing the video. Then, the first frame video data and the last frame video data need to be converted, respectively, to obtain the first frame picture and the last frame picture, and the last frame picture is converted into the last frame video of the preset duration. This process is consistent with the step S220 in the method for synchronously playing the video. Finally, the beginning of the last frame video is spliced at the end of the original video to obtain the to-be-played video. This process is consistent with the step S230.

In an embodiment of the present disclosure, after the synchronously playing the to-be-played video based on the time synchronization state with the master playback device, the slave playback device is further configured to: receive a stop playback instruction sent by the master playback device, and the stop playback instruction is sent by the master playback device when a difference between a video duration of the to-be-played video and a current playback time is less than a preset duration; and while stopping playback of the to-be-played video, display the top picture layer and the first frame picture rendered in the top picture layer.

After playing the to-be-played video based on the time synchronization state with the master playback device, the slave playback device also needs to receive the stop playback instruction sent by the master playback device. This process is consistent with the step S710 in the method for synchronously playing the video. Then, the slave playback device also needs to display the top picture layer and the first frame picture rendered in the top picture layer while stopping playing the to-be-played video. This process is consistent with the step S720 in the method for synchronously playing the video.

In an embodiment of the present disclosure, before the receiving the video playback instruction sent by the master playback device, the slave playback device is further configured to: determine a first reception time for receiving a first master-slave signal, and determine a second reception time for receiving a second master-slave signal, the first master-slave signal and the second master-slave signal are sent by the master playback device to the slave playback device; perform calculation for the first reception time and the second reception time to obtain a correction time, and perform time correction for the slave playback device according to the correction time; and realize the time synchronization state between the master playback device and the slave playback device based on the time correction.

Before receiving the video playback instruction sent from the master playback device, the slave playback device also needs to determine the first reception time for receiving the first master-slave signal, and determine the second reception time for receiving the second master-slave signal. This process is consistent with the step S410 in the method for synchronously playing the video. In addition, the slave playback device also needs to perform the calculation for the first reception time and the second reception time to obtain the correction time, and perform the time correction for the slave playback device according to the correction time. This process is consistent with the step S420 in the method for synchronously playing the video. Finally, the slave playback device also needs to realize the time synchronization state between the master playback device and the slave playback device based on the time correction. This process is consistent with the step S430 in the method for synchronously playing the video.

In an embodiment of the present disclosure, for creating the top picture layer and rendering the first frame picture to the top picture layer, the slave playback device is further configured to: obtain a to-be-played task identity carried in the video playback instruction, and determine a preset playback task identity; if a preset playback task identity consistent with the to-be-played task identity exists, create the top picture layer and render the first frame picture to the top picture layer; and if the preset playback task identity consistent with the to-be-played task identity does not exist, perform no video playback instruction.

In the process of creating the top picture layer and rendering the first frame picture to the top picture layer, the slave playback device first needs to obtain the to-be-played task identity carried in the video playback instruction, and determine the preset playback task identity. This process is consistent with the step S610 in the method for synchronously playing the video. Then, the slave playback device also needs to create the top picture layer and render the first frame picture to the top picture layer if there is the preset playback task identity that is consistent with the to-be-played task identity. This process is consistent with the step S620 in the method for synchronously playing the video. Then, the slave playback device also needs to perform no video playback instruction if there is no preset playback task identity consistent with the to-be-played task identity. This process is consistent with the step S630 in the method for synchronously playing the video.

In an embodiment of the present disclosure, the master playback device is further configured to obtain the first frame picture and the to-be-played video, the first frame picture corresponds to the original video, and the to-beplayed video is generated by splicing the beginning of the last frame video corresponding to the original video at the end of the original video; send the video playback instruction to the slave playback device, create the top picture layer, and render the first frame picture to the top picture layer, and a playback time is carried in the video playback instruction; and when the playback time is reached, hide the top picture layer, and synchronously play the to-be-played video based on a time synchronization state with the slave playback device.

The master playback device also needs to obtain the first frame picture and the to-be-played video. This process is consistent with the step S810 in the method for synchronously playing the video. Then, the master playback device also needs to send the video playback instruction to the slave playback device, create the top picture layer, and render the first frame picture to the top picture layer. This process is consistent with the step S820 in the method for synchronously playing the video. Then the master playback device also needs to, when the playback time is reached, hide the top picture layer and synchronously play the to-be-played video based on the time synchronization state with the slave playback device. This process is consistent with the step S830.

In an embodiment of the present disclosure, for synchronously playing the to-be-played video based on the time synchronization state with the slave playback device, the master playback device is further configured to: obtain a video duration corresponding to the to-be-played video, and monitor a current playback time of the to-be-played video; and if a difference between the current playback time and the video duration is less than a preset duration, send a stop playback instruction to the slave playback device to stop playing the to-be-played video while displaying the top picture layer and rendering the first frame picture to the top picture layer, and the preset duration is a duration of the last frame video.

In the process of synchronously playing the to-be-played video based on the time synchronization state with the slave playback device, the master playback device also needs to obtain the video duration corresponding to the to-be-played video and monitor the current playback time of the to-be-played video. This process is consistent with the step S910 in the method for synchronously playing the video. The master playback device also needs to, when the difference between the current playback time and the video duration is less than the preset duration, send the stop playback instruction to the slave playback device to display the top picture layer and render the first frame picture to the top picture layer while stopping the playback of the to-be-played video. This process is consistent with the step S920 in the method for synchronously playing the video.

Figure 11:
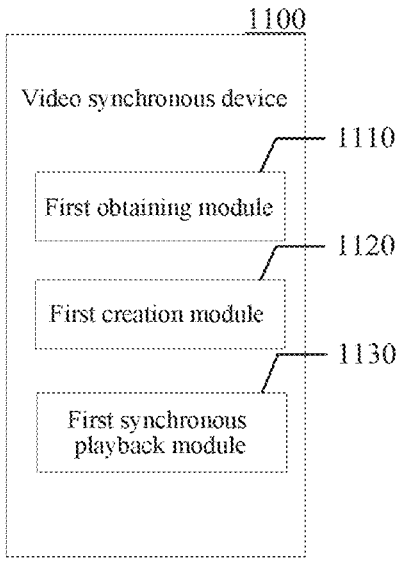
FIG. 11 schematically shows a structural diagram of a device for synchronously playing a video according to an embodiment of the present disclosure.

In addition, embodiments of the present disclosure further provide a device for synchronously playing a video. FIG. 11 shows a schematic structural diagram of a device for synchronously playing a video. As shown in FIG. 11, the device 1100 for synchronously playing the video may include: a first obtaining module 1110, a first creation module 1120 and a first synchronous playback module 1130.

The first obtaining module 1110 is configured to obtain a first frame picture and a to-be-played video, the first frame picture corresponds to an original video, and the to-be-played video is generated by splicing a beginning of a last frame video corresponding to the original video at an end of the original video. The first creation Module 1120 is configured to receive a video playback instruction sent by a master playback device, create a top picture layer, and render the first frame picture to the top picture layer. The first synchronous playback module 1130 is configured to, when a playback time carried in the video playback instruction is reached, hide the top picture layer, and synchronously play the to-be-played video based on a time synchronization state with the master playback device.

The specific details of the device 1100 for synchronously playing the video have been described in detail in the corresponding method for synchronously playing the video, which will not be described again here.

It should be noted that although several modules or units of the device 1100 for synchronously playing the video are mentioned in the above detailed description, such division of modules or units is not mandatory. In fact, features and functions of two or more of the modules or units described above may be embodied in one module or unit in accordance with embodiments of the present disclosure. Alternatively, features and functions of one module or unit described above may be further divided into multiple modules or units.

Figure 12:
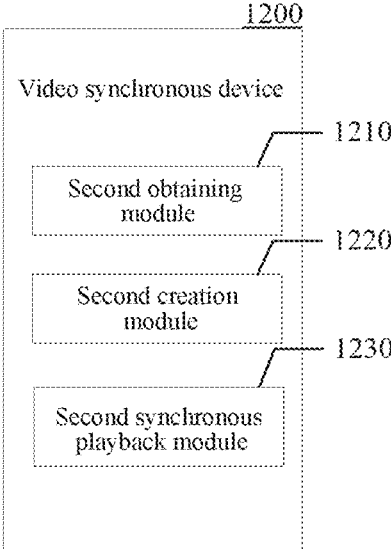
FIG. 12 schematically shows a structural diagram of another device for synchronously playing a video according to an embodiment of the present disclosure.

In addition, embodiments of the present disclosure further provide a device for synchronously playing a video. FIG. 12 shows a schematic structural diagram of a device for synchronously playing a video. As shown in FIG. 12, the device 1200 for synchronously playing the video may include: a second obtaining module 1210, a second creation module 1220 and a second synchronous playback module 1230.

The second obtaining module 1210 is configured to obtain a first frame picture and a to-be-played video, the first frame picture corresponds to an original video, and the to-be-played video is generated by splicing a beginning of a last frame video corresponding to the original video at an end of the original video. The second creation module 1220 is configured to send a video playback instruction to a slave playback device, create a top picture layer, and render the first frame picture to the top picture layer, and a playback time is carried in the video playback instruction. The second synchronous playback module 1230 is configured to, when the playback time is reached, hide the top picture layer, and synchronously play the to-be-played video based on a time synchronization state with the slave playback device.

The specific details of the device 1200 for synchronously playing the video have been described in detail in the corresponding method for synchronously playing the video, which will not be described again here.

It should be noted that although several modules or units of the device 1200 for synchronously playing the video are mentioned in the above detailed description, such division of modules or units is not mandatory. In fact, features and functions of two or more of the modules or units described above may be embodied in one module or unit in accordance with embodiments of the present disclosure. Alternatively, features and functions of one module or unit described above may be further divided into multiple modules or units.

Furthermore, embodiments of the present disclosure further provide an electronic device capable of implementing the above method.

An electronic device 1300 according to embodiments of the present disclosure is described below with reference to FIG. 13. The electronic device 1300 shown in FIG. 13 is only an example and shall not impose any restrictions on the function and scope of application of the embodiments of the present disclosure.

Figure 13:
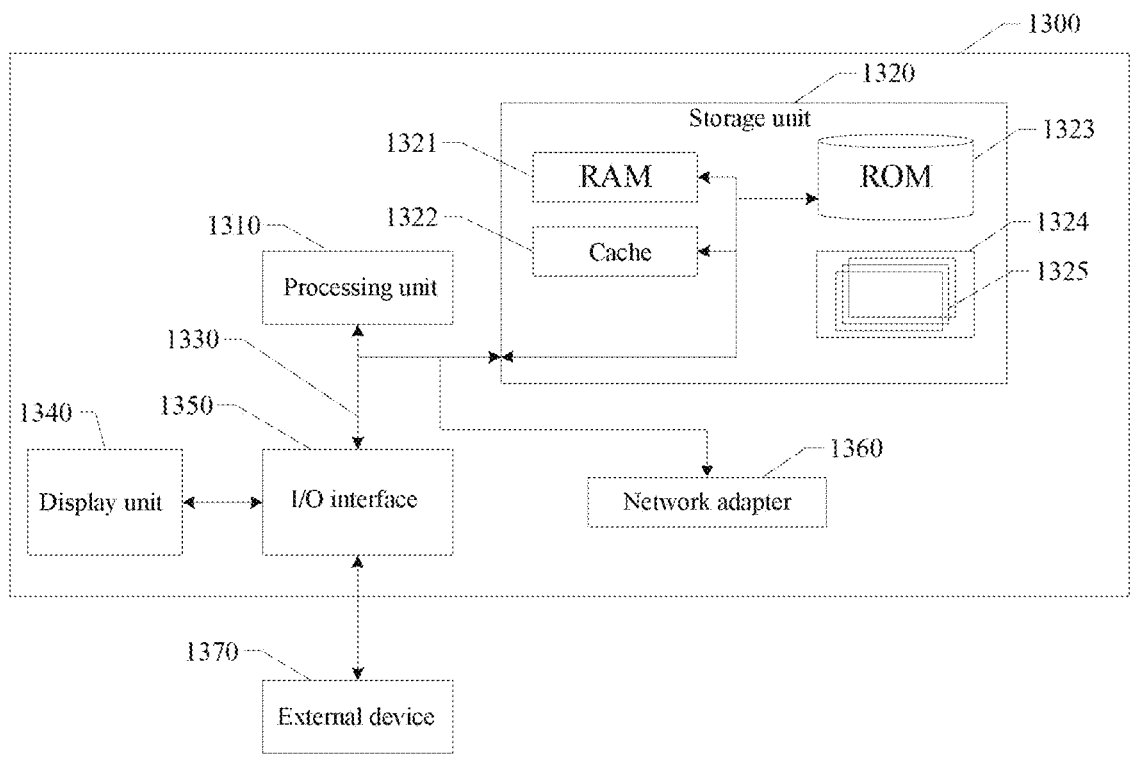
FIG. 13 schematically shows an electronic device for a method for synchronously playing a video according to an embodiment of the present disclosure.

As shown in FIG. 13, the electronic device 1300 is represented in the form of a general-purpose computing device. Components of the electronic device 1300 may include, but are not limited to, at least one processing unit 1310, at least one storage unit 1320, a bus 1330 connecting different system components (including the storage unit 1320 and the processing unit 1310), and a display unit 1340.

The storage unit is stored with program codes which, when executed by the processing unit 1310, cause the processing unit 1310 to perform the steps according to various embodiments of the present disclosure described in the "exemplary method" described above in the specification.

The storage unit 1320 may include a readable medium in the form of volatile storage unit, such as a random access memory (RAM) 1321 and/or a cache storage unit 1322, and it may further include a read-only memory (ROM) 1323.

The storage unit 1320 may also include a program/utility tool 1324 having a set of (at least one) program module 1325. Such program module 1325 includes, but is not limited to, an operating system, one or more applications, other program modules, and program data, each or a combination of the examples may include the implementation of a network environment.

The bus 1330 may be one or more of several types of bus structures, including a storage unit bus or a storage unit controller, a peripheral bus, an accelerated graphics port, a processing unit, or a local bus using any of the bus structures.

The electronic device 1300 may also communicate with one or more external devices 1370 (e.g., a keyboard, a pointing device, a Bluetooth device), or may communicate with one or more devices that enable the user to interact with the electronic device 1300, and/or communicate with any device (e.g., a router, a modem, etc.) that enables the electronic device 1300 to communicate with one or more other computing devices. The communication may be carried out through an input/output (I/O) interface 1350. Moreover, the electronic device 1300 may also communicate with one or more networks (such as a Local Area Network (LAN), a Wide Area Network (WAN) and/or a public network, e.g. Internet) via a network adapter 1360. As shown in the figure, the network adapter 1360 communicates with other modules of the electronic device 1300 via the bus 1330. It should be noted that although not shown in the figure, other hardware and/or software modules may be used in conjunction with the electronic device 1300, including, but not limited to, a microcode, a device driver, a redundancy processing unit, an external disk drive array, an RAID system, a tape drive, and a data backup storage system.

Through the description of the above-mentioned embodiments, it is easy for those skilled in the art to understand that the exemplary embodiments described here may be implemented by software or by software in combination with necessary hardware. Therefore, the technical solution of the embodiments of the present disclosure may be embodied in the form of a software product which may be stored in a non-volatile storage medium (which may be a CD-ROM, a USB flash disk, or mobile hard disk) or on a network and which may include several instructions to enable a computing device (which may be a personal computer, a server, a terminal device, or a network device) to implement the method according to embodiments of the present disclosure.

In the embodiments of the present disclosure, there is further provided a computer-readable storage medium stored thereon with a program product capable of implementing the method described above in the specification. In some possible embodiments, various aspects of the present disclosure may also be implemented in the form of a program product, which includes program codes. When the program product is running on a terminal device, the program codes is configured to cause the terminal device to perform the steps according to various embodiments of the present disclosure described in the "exemplary methods" described above in the specification.

Figure 14:
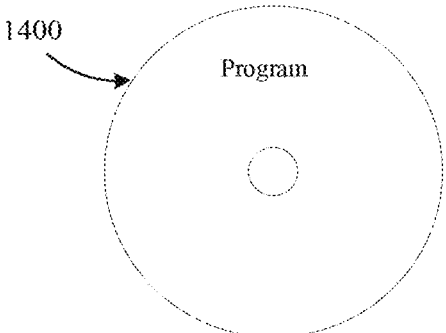
FIG. 14 schematically shows a non-transitory computer readable storage medium for a method for synchronously playing a video according to an embodiment of the present disclosure.

Referring to FIG. 14, a program product 1400 for implementing the above method according to an embodiment of the present disclosure is described. The program product 1400 may use a portable compact disk read-only memory (CD-ROM), and include program codes, and may be running on a terminal device, such as a personal computer. However, the program product of the present disclosure is not limited to this. In this document, a readable storage medium may be any tangible medium containing or storing a program, which may be used by or used in combination with an instruction execution system, apparatus, or device.

The program product may adopt any combination of one or more readable mediums. The readable medium may be a readable signal medium or a readable storage medium. The readable storage medium may be, for example, but not limited to, electrical, magnetic, optical, electromagnetic, infrared, or semiconductor systems, apparatuses or devices, or any combination thereof. More specific examples (non-exhaustive list) of the readable storage medium include: electrical connections with one or more wires, a portable disk, a hard disk, a random access memory (RAM), a read-only memory (ROM), an erasable programmable read-only memory (EPROM or flash), an optical fiber, a portable compact disk read-only memory (CD-ROM), an optical storage device, a magnetic storage device, or any suitable combination thereof.

A computer-readable signal medium may include a data signal transmitted in a baseband or as part of a carrier, which carries a readable program code. The transmitted data signal may be represented in many forms, including, but not limited to, an electromagnetic signal, an optical signal, or any suitable combination thereof. The readable signal medium may also be any readable medium other than the readable storage medium, which may send, propagate, or transmit programs which are used by, or used in conjunction with an instruction execution system, apparatus, or device.

Program codes contained on the readable medium may be transmitted with any appropriate medium, which includes, but is not limited to, wireless, wired, an optical cable, RF, etc., or any suitable combination thereof.

Program codes for performing an operation of the present disclosure may be written in any combination of one or more programming languages, which include object-oriented programming languages such as Java, C++, conventional procedural programming languages such as "C" language or similar programming languages. The program codes may be executed entirely on a user computing device, partially on a user device, as a separate software package, partially on a user computing device and partially on a remote computing device, or entirely on a remote computing device or a server. In the case where the remote computing device is involved, the remote computing device may be connected to the user computing device through any kind of network, including a Local Area Network (LAN) or a Wide Area Network (WAN), or may be connected to an external computing device (for example, connected through the internet by using an internet service provider).

Other embodiments of the present disclosure will be apparent to those skilled in the art from consideration of the specification and practice of the present disclosure disclosed here. The disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A method for synchronously playing a video, performed by a slave playback device, comprising:
   obtaining a first frame picture and a target video, wherein the first frame picture corresponds to an original video, and the target video is generated by splicing a beginning of a last frame video corresponding to the original video at an end of the original video;
   receiving a video playback instruction sent by a master playback device, creating a top picture layer, and rendering the first frame picture to the top picture layer; and
   when a playback time carried in the video playback instruction is reached, hiding the top picture layer, and synchronously playing the target video with the master playback device based on a time synchronization state with the master playback device.

2. The method according to claim 1, wherein the obtaining the first frame picture and the target video comprises:
   obtaining the original video, and intercepting first frame video data and last frame video data from the original video, respectively;
   converting the first frame video data and the last frame video data into the first frame picture and a last frame picture, respectively, and converting the last frame picture into the last frame video of a preset duration; and
   splicing the beginning of the last frame video at the end of the original video to obtain the target video.

3. The method according to claim 2, wherein the method further comprises:
   receiving a stop playback instruction sent by the master playback device, wherein the stop playback instruction is sent by the master playback device when a difference between a video duration of the target video and a current playback time is less than the preset duration; and
   while stopping playback of the target video, displaying the top picture layer and the first frame picture rendered in the top picture layer.

4. The method according to claim 1, wherein the method further comprises:
   determining a first reception time for receiving a first master-slave signal, and determining a second reception time for receiving a second master-slave signal, wherein the first master-slave signal and the second master-slave signal are sent by the master playback device to a slave playback device; and
   performing calculation for the first reception time and the second reception time to obtain a correction time, and performing time correction for the slave playback device according to the correction time to make the slave playback device in the time synchronization state with the master playback device.

5. The method according to claim 1, wherein the creating the top picture layer and rendering the first frame picture to the top picture layer comprises:
   obtaining a to-be-played task identity carried in the video playback instruction, and determining a preset playback task identity;
   in response to determining that a preset playback task identity consistent with the to-be-played task identity exists, creating the top picture layer and rendering the first frame picture to the top picture layer; and in response to determining that the preset playback task identity consistent with the to-be-played task identity does not exist, performing no video playback instruction.

6. An electronic device, comprising:

a processor;

a memory, configured to store executable instructions for the processor;

wherein the processor is configured to perform the method for synchronously playing the video according to claim 1 by performing the executable instructions.

7. A non-transitory computer readable storage medium having a computer program stored thereon which, when executed by a processor, implements the method for synchronously playing the video according to claim 1.

8. A method for synchronously playing a video, performed by a master playback device, comprising:

obtaining a first frame picture and a target video, wherein the first frame picture corresponds to an original video, and the target video is generated by splicing a beginning of a last frame video corresponding to the original video at an end of the original video;

sending a video playback instruction to a slave playback device, creating a top picture layer, and rendering the first frame picture to the top picture layer, wherein a playback time is carried in the video playback instruction; and when the playback time is reached, hiding the top picture layer, and synchronously playing the target video with the slave playback device based on a time synchronization state with the slave playback device.

9. The method according to claim 8, wherein the method further comprises:

obtaining a video duration corresponding to the target video, and monitoring a current playback time of the target video; and in response to determining that a difference between the current playback time and the video duration is less than a preset duration, sending a stop playback instruction to the slave playback device to make the slave playback device stop playing the target video while displaying the top picture layer and the first frame picture rendered in the top picture layer, wherein the preset duration is a duration of the last frame video.

10. An electronic device, comprising:

a processor;

a memory, configured to store executable instructions for the processor;

wherein the processor is configured to perform the method for synchronously playing the video according to claim 8 by performing the executable instructions.

11. A non-transitory computer readable storage medium having a computer program stored thereon which, when executed by a processor, implements the method for synchronously playing the video according to claim 8.

12. A system for synchronously playing a video, comprising a master playback device, a slave playback device and an Internet of Things platform, wherein:

the Internet of Things platform is configured to send an original video to the slave playback device and the master playback device;

the master playback device is configured to: obtain a first frame picture and a target video, wherein the first frame picture corresponds to the original video, and the target video is generated by splicing a beginning of a last frame video corresponding to the original video at an end of the original video; send a video playback instruction to the slave playback device, create a top picture layer, and render the first frame picture to the top picture layer, wherein a playback time is carried in the video playback instruction; and when the playback time is reached, hide the top picture layer, and synchronously play the target video with the slave playback device based on a time synchronization state with the slave playback device; and the slave playback device is configured to: obtain the first frame picture and the target video; receive the video playback instruction sent by the master playback device, create the top picture layer, and render the first frame picture to the top picture layer; and when the playback time is reached, hide the top picture layer, and synchronously play the target video with the master playback device based on the time synchronization state with the master playback device.

13. The system according to claim 12, wherein the Internet of Things platform is further configured to send a synchronous playback task to the master playback device, wherein the synchronous playback task corresponds to the target video.

14. The system according to claim 13, wherein the master playback device is further configured to start a countdown timer corresponding to the synchronous playback task to send the video playback instruction to the slave playback device when countdown corresponding to the countdown timer ends.

15. The system according to claim 12, wherein the slave playback device is further configured to: receive the original video from the Internet of Things platform, and intercept first frame video data and last frame video data from the original video, respectively; convert the first frame video data and the last frame video data into the first frame picture and a last frame picture, respectively, and convert the last frame picture into the last frame video of a preset duration; and splice the beginning of the last frame video at the end of the original video to obtain the target video.

16. The system according to claim 15, wherein the slave playback device is further configured to: receive a stop playback instruction sent by the master playback device, wherein the stop playback instruction is sent by the master playback device when a difference between a video duration of the target video and a current playback time is less than the preset duration; and while stopping playback of the target video, display the top picture layer and the first frame picture rendered in the top picture layer.

17. The system according to claim 12, wherein the slave playback device is further configured to: determine a first reception time for receiving a first master-slave signal, and determine a second reception time for receiving a second master-slave signal, wherein the first master-slave signal and the second master-slave signal are sent by the master playback device to the slave playback device; and perform calculation for the first reception time and the second reception time to obtain a correction time, and perform time correction for the slave playback device according to the correction time to make the slave playback device in the time synchronization state with the master playback device.

18. The system according to claim 12, wherein the slave playback device is further configured to: obtain a to-be-played task identity carried in the video playback instruction, and determine a preset playback task identity; if a preset playback task identity consistent with the to-be-played task identity exists, create the top picture layer and render the first frame picture to the top picture layer; and if the preset playback task identity consistent with the to-be-played task identity does not exist, perform no video playback instruction.

19. The system according to claim 12, wherein the master playback device is further configured to: obtain a video duration corresponding to the target video, and monitor a current playback time of the target video; and if a difference between the current playback time and the video duration is less than a preset duration, send a stop playback instruction to the slave playback device to make the slave playback device stop playing the target video while displaying the top picture layer and the first frame picture rendered in the top picture layer, wherein the preset duration is a duration of the last frame video.

\* \* \* \* \*